United States Patent [19]
Williams

[11] Patent Number: 5,230,325
[45] Date of Patent: Jul. 27, 1993

[54] CHARCOAL LIGHTER DEVICE

[75] Inventor: Stanley J. Williams, Oakhurst, Calif.

[73] Assignee: Bhupindar Singh, Northridge, Calif.

[21] Appl. No.: 942,857

[22] Filed: Sep. 10, 1992

[51] Int. Cl.⁵ .............................................. F24B 3/00
[52] U.S. Cl. .................................. 126/25 B; 126/146
[58] Field of Search ................ 126/25 R, 25 B, 9 R, 126/9 A, 146, 145, 152 R

[56] References Cited

U.S. PATENT DOCUMENTS

| | | | |
|---|---|---|---|
| 3,073,263 | 1/1963 | Wynkoop | 126/25 B |
| 3,216,379 | 11/1965 | Durfee | 126/25 B |
| 3,339,505 | 9/1967 | Bean | 126/25 B |
| 3,453,975 | 7/1969 | Gunter | 126/25 B |
| 4,503,835 | 3/1985 | Williams | 126/25 B |
| 4,909,237 | 3/1990 | Karpinia | 126/25 B |

*Primary Examiner*—James C. Yeung
*Attorney, Agent, or Firm*—Henry M. Bissell

[57] ABSTRACT

The charcoal lighter device uses wadded paper or other readily combustible, non-polluting material in place of polluting charcoal lighter fluid as a fire starter. The device has a housing which includes inner and outer concentric shells surrounding a central space with open top and bottom. The shells are mounted by thermally insulative connectors, such as ceramic blocks, joined to the sidewalls of both shells. The inner shell terminates short of the outer housing bottom, defining a space for the starter material. A horizontal charcoal grate is installed at the bottom of the inner shell. A series of spaced air holes extend through the outer shell below the grate. In use, charcoal is loaded above the grate with wadded newspaper below. When lighted, one newspaper sheet serves to start the charcoal which is soon glowing and ready for barbecuing. A thermally insulative handle is connected to the outer shell. The outer shell and handle remain relatively cool and safe to touch during use of the device.

8 Claims, 1 Drawing Sheet

CHARCOAL LIGHTER DEVICE

BACKGROUND OF THE INVENTION

1. Field of the Invention

The present invention generally relates to charcoal lighters for home barbecue use and, more particularly, to an improved safe, non-polluting charcoal lighter device.

2. Description of the Related Art

Charcoal briquettes and similar fuels for outdoor barbecues and other cooking are usually lighted by pouring a petroleum liquid or fraction on it and striking a match to it. Unfortunately, fumes from the petroleum liquid before lighting the fire and combustion products of the burning petroleum liquid seriously pollute the atmosphere, so much so that many communities have enacted or are considering legislation to ban the use of petroleum and other flammable liquids as fire starters. Similar pollution problems arise from the use of alcohol in place of petroleum liquids.

As a consequence, various types of charcoal lighters have been devised, which lighters do not require the use of any flammable liquids. One such lighter employs a single-walled cylinder or drum having a charcoal-bearing grate, below which are stuffed used newspapers and the like to be lighted by a match. The external handle of the cylinder is connected to the side of the cylinder by a metal bracket and metal bolts, all of which become very hot, as does the cylinder, when the newspapers are burned in the device. Temperatures as high or higher than about 450 degrees F. are reached for the cylinder so that the user can be easily inadvertently burned by touching the cylinder wall or even by tightly gripping the handle. Moreover, the lighter is not very efficient. It does not heat the charcoal rapidly because much heat is lost through the cylinder sidewalls.

Accordingly there is a need for a safe, inexpensive, durable charcoal lighter device which does not utilize flammable liquids and which effectively protects the user against blisters and burns. Moreover, the device should be rapid and efficient in heating the charcoal to the desired incandescent state.

SUMMARY OF THE INVENTION

The improved charcoal lighter device of the present invention satisfies all the foregoing needs. The device is substantially as set forth in the Abstract of the Disclosure. The device comprises a housing with a thermally insulated handle. The housing comprises two concentric shells with open tops and bottoms and closed upstanding interconnected sidewalls. Although shown in the drawings as being generally octagonal in cross section, it will be understood that these shells may be of any suitable geometric shape. The inner shell is the heating shell and is preferably of steel. It has a central heating space in which is seated, preferably releasably, a horizontal steel or other metal grid or grate for holding charcoal briquettes. A horizontal spaced series of air openings extends through the outer shell at about the level of the grate, which is slightly above the bottom of the inner shell Preferably the grid or grate is supported on extensions of the horizontal rods constituting part of the grid framework which protrude in to the mounting holes in the inner shell.

The top of the inner shell is about level with the top of the outer shell, but the inner shell is shorter than the outer shell so that its bottom terminates well above that of the outer shell. A plurality of spaced thermally insulative connectors of ceramic or the like are disposed between the two shells near the tops thereof and connected to the sidewalls thereof to hold the shells in a fixed non-contacting relation and to form an insulating gap. At the bottom of the inner shell, separation is established by a plurality of tabs formed by bending outwardly portions of the inner shell at the base thereof. These tabs are effective both as spacers for the bottom portion of the inner shell maintaining it substantially equidistant from the outer shell about its periphery and to substantially close off the bottom inter-shell space thus, the air in this space, which rises as it is heated is drawn in through the series of openings in the outer shell at great level. This is cooler ambient air which is drawn in from outside the device, at the base of the fire chamber in the lower part of the device.

The outer shell preferably is of aluminum and is thermally isolated from the inner shell by the insulating gap. This increases the efficiency of heating effected by the device. Because the outer shell remains relatively cool during use of the device, the handle attached thereto also remains relatively cool. The area in the housing below the grate is the fuel chamber into which, from the bottom of the devices, can be inserted newspapers and other solid non-polluting combustibles before firing up the device. A plurality of spaced air vents pass through the sidewalls of the outer shell near the bottom thereof into the fuel chamber to facilitate efficient combustion of the starter fuel and to enable the fuel to be lighted while the device is resting on its bottom.

The device can be made inexpensively in any suitable size and is durable, safe and efficient. Further features of the invention are set forth in the following detailed description and accompanying drawings.

BRIEF DESCRIPTION OF THE DRAWING

A better understanding of the present invention may be realized from a consideration of the following detailed description, taken in conjunction with the accompanying drawings, in which.

DETAILED DESCRIPTION OF THE PREFERRED EMBODIMENT

Figure 1:
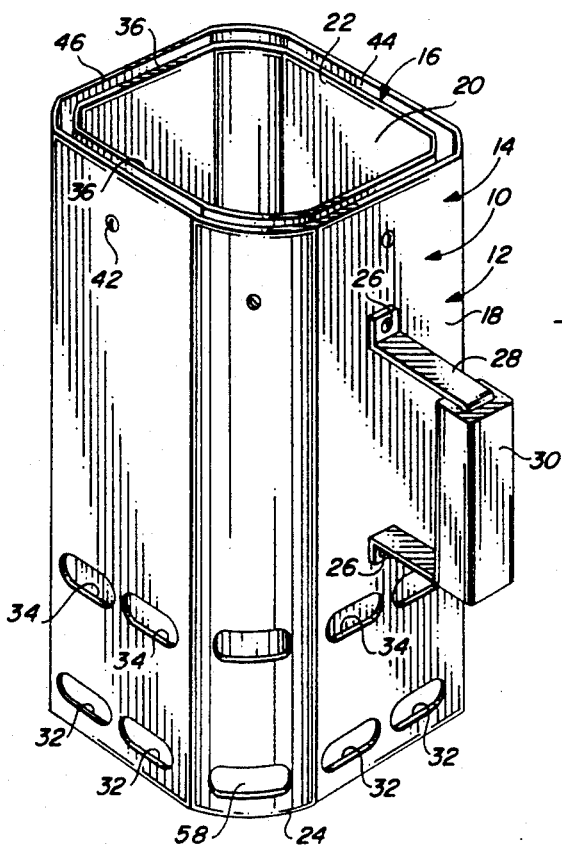
FIG. 1 is a schematic side perspective view of a first preferred embodiment of the improved charcoal lighter device of the present invention.
Figure 2:
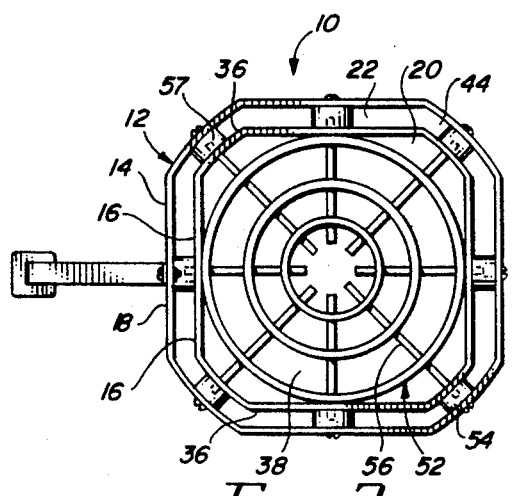
FIG. 2 is a schematic top plan view of the device of FIG. 1.
Figure 3:
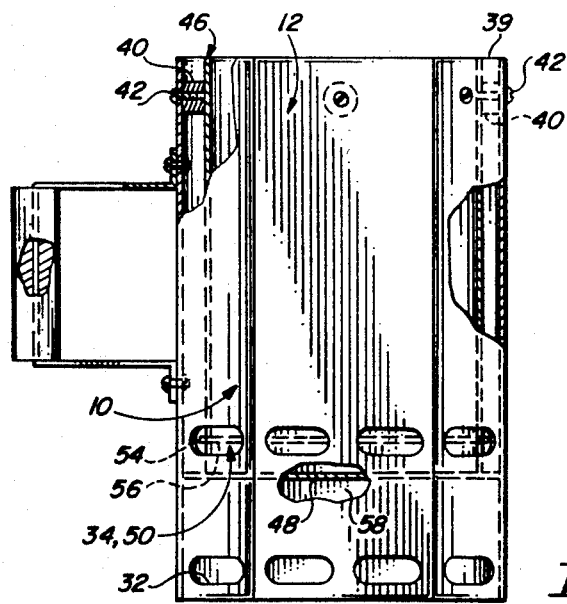
FIG. 3 is a schematic side elevation, partly broken away, of the device of FIG. 1.

Now referring more particularly to FIGS. 1-3 of the drawings, a preferred embodiment of the improved charcoal lighter device of the present invention is schematically depicted therein. Thus, device 10 is shown. It will be understood that device 10 can be used to light softwood, hardwood, coal lignite and other solid combustibles, in addition to charcoal in briquette or other form.

Device 10 comprises a generally vertical hollow housing 12 having an octagonal configuration (in plan view). Housing 12 comprises an outer shell 14, preferably of aluminum, and spaced inwardly thereof an inner concentric heating shell 16, preferably of steel, iron or copper, of substantially similar configuration. Shell 14 comprises eight spaced, interconnected upstanding sidewalls 18 collectively defining a central space 20 communicating with the open top 22 of housing 12 and the open bottom 24 thereof.

To the outer surface of a sidewall 18 is securely affixed, as by rivets 26, a U-shaped metal bracket around which is connected a thermally insulative handle 30 of plastic, wood or the like. Shell 14 has a first series of spaced horizontal slots or air holes 32 extending through its sidewalls 18 adjacent bottom 24 and a second similar series of horizontal slots or air holes 34 spaced well about air holes 32.

Inner heating shell 16 comprises eight spaced interconnected upstanding sidewalls 36 collectively defining a central space 38 communicating with open top 22 and bottom 24. Shell 16 is disposed in space 20 with sidewalls 36 uniformly spaced inwardly from sidewalls 18 and held in fixed relation thereto by a spaced plurality of thermally insulative solid connectors 40, preferably ceramic blocks, between sidewalls 18 and 36 and secured thereto, as by screws 42. The resulting gap 44 between sidewalls and 36 protects against heat transfer from sidewalls 36 to sidewalls 18 during use of device 10, thus keeping shell 14 and handle 30 relatively cool and safe against burning the user. The outer shell 14 and handle 30 are further cooled by the flow of air through the space 44 between sidewalls 18 and 36 which enters circulating air through the openings 34 and rises through the space 44 to exit the somewhat elevated temperature at the top 22 outside the inner shell 16. The bottom of this inter-shell space is preferably substantially closed off by outwardly directed tabs at the bottom of the inner shell 16.

Shell 16 is shorter than shell 14 and is connected thereto by the connectors 40 such that the upper end 46 of shell 16 is at about top 22 of device 10 while the lower end 48 of shell 16 terminates slightly below holes 34 of outer shell 14 and well above bottom 24. A charcoal-holding grate 52, preferably of steel, aluminum or copper wire, is permanently secured in shell 16 as by the outer end 54 of spokes 56 thereof being disposed through openings 57 in sidewalls 36.

Grate 52 is held in shell 16 just above the bottom thereof. The area below grate 52 in housing 12 forms a fuel chamber 58 into which combustible waste solid materials, such as balled newsprint and the like (not shown) can be inserted through open bottom 24 to serve as fuel for heating the charcoal on grate 52 Holes 32 extend into chamber 58 for maximum heating and it is through holes 32 that the fuel in chamber 58 efficiency, and it is through holes 32 that the fuel in chamber 58 can be easily lighted, as by a match.

Thus, device 10 is used by inserting balled or crumpled newspapers in chamber 58 from open bottom 24, resting device 10 on bottom 24 placing charcoal on grate 52 through top 22, and then lighting the fuel in chamber 58 through holes 32. Because of the efficiency of heating of device 10, due to its double-walled insulative construction, charcoal can be brought to a desired uniformly lighted (burning) condition, usually within about 10-15 minutes, in contrast to the longer times needed for conventional charcoal burners.

When it is desired to remove the lighted charcoal from device 10, housing 12 is lifted by handle 30 and inverted over the desired charcoal-receiving area, without danger of burning or blistering the user, because shell 14 and handle 30 remain relatively cool. It will be understood that device 10 can be inexpensively made of any desired suitable materials and in any appropriate size and configuration. It is light in weight, easy to use, durable and efficient.

Although there has been described hereinabove one specific arrangement of an improved charcoal lighter device in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An improved charcoal lighter device, said device comprising, in combination:
   a) a housing comprising
      i) an outer shell comprising a plurality of spaced, interconnected, upstanding sidewalls collectively defining an open top and open bottom for said housing and a central space in communication with said top and bottom, said sidewalls having a first series of spaced openings therethrough adjacent said bottom and a second series of spaced openings thereabove; and
      ii) an inner heating shell of shorter height than said outer shell and comprising a plurality of spaced, interconnected, upstanding sidewalls collectively defining an open top and open bottom and a central space communicating therewith;
   b) a spaced plurality of thermally insulative connectors rigidly securing said inner shell inside said central space of said outer shell with said sidewalls of said inner shell substantially uniformly spaced inwardly from said sidewalls of said outer shell so that said shells are generally concentric and form an insulative gap therebetween, said tops of said two shells being at substantially the same height; and
   c) a substantially horizontal charcoal grate connected to said sidewalls of said inner shell adjacent said bottom of said inner shell at about the level of said second series of openings, said first series of openings being below said grate and below said bottom of said inner shell, the area below said grate in said outer shell forming a fuel chamber for said device.

2. The device of claim 1 wherein a thermally insulative handle is connected to a sidewall of said outer shell and extends outwardly therefrom.

3. The device of claim 2 wherein said sidewalls are generally vertical and wherein said device rests on the bottom of said sidewalls of said outer shell, wherein access to said fuel chamber is through said open bottom of said outer shell and wherein said two series of openings are generally horizontal.

4. The device of claim 3 wherein said grate is removable, resting in openings formed in said sidewalls of said inner shell and wherein said upper series of openings extend through said sidewalls of said inner shell.

5. The device of claim 3 wherein said inner shell and said grate comprise steel, wherein said outer shell comprises aluminum, wherein said insulative connectors comprise ceramic, and wherein said handle comprises plastic disposed around a metal bracket.

6. The device of claim 5 wherein said sidewalls are elongated, wherein said housing in plan view is generally octagonal in shape and wherein said fuel chamber is dimensioned to accept wads of paper as fuel.

7. The device of claim 6 wherein at least said outer shell comprises two pairs of opposed, generally planar sidewalls interspersed with two pairs of opposed, generally curved sidewalls interconnected with each other to form said generally octagonal shape.

8. The device of claim 7 wherein said inner shell also comprises two pairs of opposed, generally planar sidewalls interspersed with two pairs of opposed, generally curved sidewalls interconnected with each other to form said generally octagonal shape.

* * * * *